Oct. 9, 1956 W. OLSEN 2,766,330

TELEPHONE HAND SET HOLDER

Filed April 17, 1953

INVENTOR.
WILLIAM OLSEN

BY L. S. Saulsbury
ATTORNEY

United States Patent Office 2,766,330
Patented Oct. 9, 1956

2,766,330

TELEPHONE HAND SET HOLDER

William Olsen, Miami, Fla.

Application April 17, 1953, Serial No. 349,403

2 Claims. (Cl. 179—150)

This invention relates to telephone hand set holders.

It is an object of the present invention to provide a telephone hand set holder which permits both hands to be free while having a telephone conversation, thereby permitting the user to write or look into books or catalogues while conversing on the telephone.

It is another object of the present invention to provide a telephone hand set holder of the above type wherein it is unnecessary to remove the receiver from the holder and place it back on the cradle when the conversation has ended.

Other objects of the present invention are to provide a telephone hand set holder bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which.

Figures 1, 2, 3, 4, 5:
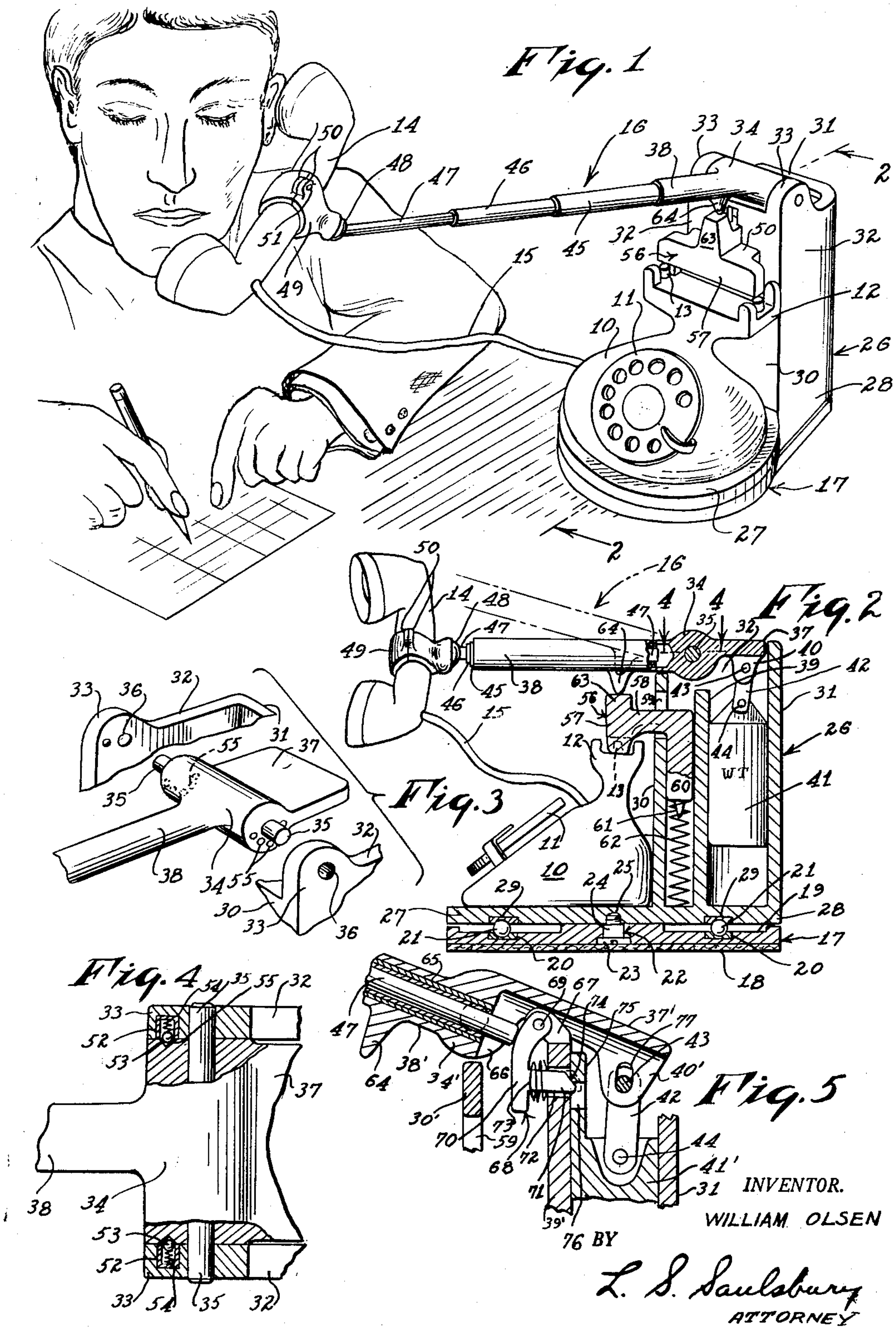
Figure 1 is a perspective view of a telephone receiver holder embodying the features of the present invention with the holder and hand set thereon being extended for use.
Fig. 2 is an enlarged vertical sectional view taken along the line 2—2 of Fig. 1.
Fig. 3 is a fragmentary exploded perspective view of a portion of the holder.
Fig. 4 is a transverse sectional view taken along the line 4—4 of Fig. 2.
Fig. 5 is a view similar to Fig.2 but showing a modified form of the invention.

Referring now more in detail to the drawing, in which similar reference numerals identify corresponding parts throughout the several views, there is shown a conventional telephone hand set including the base 10, dial 11, cradle 12, switches 13 and a combined transmitter and receiver hand set 14 adapted to rest on the cardle 12 when not in use and connected with the base 10 by the usual insulated cord 15.

In the practice of my invention, the hand set holder, referred to collectively as 16, is provided and includes a circular base portion 17, substantially as illustrated. Felt 18 is suitably secured to the undersurface of base 17 in order to prevent the scratching of the table.

Annular groove 19 is provided on the upper surface of base 17 in which the lower race 20 for ball bearings 21 is mounted.

An upwardly extending screw 22 is mounted in the center of base 17 and includes a head 23, a smooth shoulder portion 24 and an externally threaded portion 25 extending upwardly above the upper surface of base 17, as shown in Fig. 2. Upward displacement of the screw 22 through the base 17 is prevented by the head 23 and shoulder portion 24, while the downward displacement of the screw 22 will be prevented by the felt 18, as will be obvious.

A casing 26 rests on base 17 and includes a base portion made up of a forward circular portion 27 adapted to support the telephone hand set base 10 and a rectangular rear base portion 28. The undersurface of base portion 27 is provided with an upper race 29 for ball bearings 21 as well as a central opening receiving the upwardly extending threaded end 25 of screw 22, permitting the base of housing 26 to be readily rotated upon base 17, as desired.

The casing 26 includes a front wall 30, a rear wall 31 and side walls 32, substantially as illustrated. The top of casing 26 is open while the upper edges of side walls 32 adjacent front wall 30 are integrally formed with upwardly extending ears 33.

A cylindrical member 34 is provided at each end with shaft projections 35 which are rotatably mounted in openings 36 provided in ears 33, the rear side of cylindrical member 34 being integrally formed with a flat extension 37 and on the side remote therefrom with a hollow cylindrical tube 38.

A partition 39 is provided intermediate the front wall 30 and rear wall 31, as shown in Fig. 2, the upper edge of partition 39 terminating somewhat below cylindrical member 34.

The undersurface of the flat extension 37 is integrally formed with a downwardly extending lug 40 from which is suspended a counterweight 41 intermediate rear wall 31 and partition 39 by means of a suspended link 42 and pins 43 and 44, as shown in Fig. 2. It will be noted that the counterweight 41 is slidable vertically intermediate rear wall 31 and partition 39.

The hollow cylindrical tube 38 represents the innermost portion of a telescopic arm including telescopic elements 45, 46 and 47, the outer end of element 47 terminating in a universal joint 48 on which is mounted a two part clamp 49, adapted to be suitably secured about the central portion of the combined transmitter and receiver 14, as shown in Figs. 1 and 2. It will be noted that the clamp 49 comprises semicircular parts secured together by coinciding lugs 50 and screws 51, substantially as illustrated.

As shown in Figs. 3 and 4, the lugs 33 on their inner faces are provided with cylindrical members 52 opening onto the inner faces of the lugs 33 and housing detent balls 53 and springs 54, the springs 54 serving to urge the balls 53 outwardly of cylindrical members 52 and into a plurality of radially spaced depressions 55 provided at opposite ends of cylindrical member 34, thus releasably locking the member 34 and associated parts in a plurality of elevations, as will be obvious. To raise or lower the holder, it is only necessary to rotate the tube 38 until the balls 53 snap into the appropriate depression 55, the elevational movement of the tube 38 and the associated telescopic elements being, of course, facilitated by the counterweight 41, which is of such a weight as to more or less balance the combined weight of the telescopic holder portion and the combined receiver and transmitter hand set 14.

A bridge member 56 is provided and includes a portion 57 adapted to rest on switch push buttons 13, a rearwardly extending portion 58 passing through an opening 59 provided in front wall 30 and terminating in a downwardly extending portion 60 (see Fig. 2) slidable vertically intermediate front wall 30 and partition 39, the lower end of downwardly extending portion 60 being provided with a point 61 which receives the upper end of an expansion spring 62 located between front wall 30 and partition 39. Thus, the member 56 will be normally urged upwardly out of engagement with switch push buttons 13 by the spring 62, as will be obvious. However, the top of member 56 is integrally formed with an upwardly extending portion 63 adapted to be engaged by a downwardly extending lug 64 provided on the undersurface of tubular portion 38. Thus, when the elements 45, 46 and 47 are retracted, as shown in Fig. 2, and the cylindrical member 35 rotated so that the telescopic portion is substantially horizontally disposed, the lug 64 will engage the member 56 against the action of spring 62 to retain the switch buttons 13 in an open position, similar to that occurring when the hand set 14 normally rests on cradle 12 of the base 10.

When the telephone rings, the tube 38 will be pivoted upwardly to the dotted line position of Fig. 2 and retained therein by the ball detent 53 entering any one of the depressions 55, permitting the member 56 to rise upwardly under the action of spring 62 away from switch buttons 13. The telescopic elements 38, 45, 46 and 47 are then extended, as shown in Fig. 1, to accommodate the hand set 14 to the user. Thus, the hand set 14 is held in the usual manner by means of a clamp 49 and holder 16, permitting the user to utilize both hands for writing or turning the pages of books or catalogues while at the same time carrying on a telephone conversion. The universal joint 48 permits further accommodation of the hand set 14 to the position of the ear and mouth, as will be obvious. Also, rotational movement about a vertical axis is provided by the ball bearings 21 and central screw 22 which permit the holder 16 and base 10 to rotate in a horizontal plane, further accommodating the position of the hand set 14 to the user's head.

Referring now particularly to Fig. 5, there is shown a modified form of the invention, differing from the first form in the provision of means for automatically relieving the counterweight from the holder to facilitate the downward movement of the telescopic portion when returning the same to the inoperative position.

In this form, a tubular member 38′ is provided with a central opening 65 which extends through a cylindrical member 34′, the latter having a cut out portion 66 which is adjacent the front wall 30′. A partition 39′ extends now above the top of front wall 30′ and is integrally formed with a forwardly extending lug 67 which has a trigger member 68 pivotally mounted thereon by means of a pin 69, the trigger member 68 has an arcuate portion 70 adapted to be engaged by the inner end of telescopic element 47 when in a retracted position and an extension 71 disposed at right angles to the portion 70, and extends through an opening 72 in the partition 39′. A compression spring 73 sleeves the extension 71 intermediate portion 70 and partition 39′ to normally urge the trigger member 68 away from the partition. The end of extension 71 is provided with a cam surface 74 while the counterweight 41 at the top thereof adjacent the inner face of partition 39′ is integrally formed with an upstanding portion 75 having an opening 76 adapted to be aligned with the opening 72. Upon inward movement of the extension 71 the cam surface 74 serves to raise the extension 75 and thereby counterweight 41′. In this form of the invention a depending lug 40′ is one a rear extension 37′ of the tubular member 38′ is provided with an elongated opening 77 receiving pin 43 so that some lost motion can be had between the weight 41′ and the trigger extension 71 so that extension 71 can readily enter the opening 76 in the weight. When the telescopic elements are collapsed after the conversation has been completed, the inner end of outer element 47 will press trigger member 68 inwardly against the action of spring 73 so that the extension 71 thereof passes through the opening 72 and into the opening 76 to render the weight ineffective while the hand set 14 is lowered to depress the switch buttons on the telephone base in the same manner as above described in connection with the first form of the invention.

In this form, the inner end of outer element 47 is provided with an eye 78 which secures one end of a spring 79 passing downwardly around a roller 80 provided in lug 40 of tabular portion 37. The counterweight 41 is connected to a second lug 81 by means of a linkage 42′ and pins 43′ and 44′. The linkage 42′ is integrally formed with a laterally extending lug 82 provided with an opening in which is secured the other end of spring 79. Thus, as the outer element 47 is telescoped inwardly, the tension in spring 79 is released permitting the linkage 42′ to hang vertically and support the counterweight 41 in this manner. However, when the element 47 is extended to the outermost position, the spring 79 is subjected to tension which rotates the linkage 42′ in a counterclockwise direction, moving the counterweight 41 further away from the cylindrical member 34, increasing thereby the momentum of the counterweight and compensating for the increased momentum of the hand set when in the extended position.

In other respects the form of the invention shown in Fig. 5 is the same as that shown in Figs. 1 through 4, and like reference numerals identify like parts throughout the several views.

While various changes may be made in the detailed construction, it shall be understood that such changes shall be within the spirit and scope of the present invention, as defined by the appended claims.

I claim:

1. A telephone handset holder comprising a base, a casing mounted on said base for turning movement about a vertical axis with respect thereto, said casing having a forwardly-extending platform portion adapted to support a telephone handset base that has a cradle with press button switches extending upwardly therefrom and normally adapted for the resting thereon of a handset and a rear bottom portion with front, rear and side walls extending upwardly therefrom, a weight device vertically-slidable between said walls, a handset supporting arm pivoted upon said walls for upward pivotal movement and having a clamp on the forward end adapted for the securement thereto of the handset, said weight device connected to the other end of the arm rearwardly of its pivotal connection with the side walls whereby said weight may serve to normally elevate the forward end of said arm and handset, means associated with said supporting arm and engageable with the press buttons of the cradle of the telephone base to depress said press buttons when the handset supporting arm is lowered onto the telephone base, and automatic means for rendering said weight device ineffective, as the supporting arm is lowered onto said telephone base, whereby to automatically disconnect the telephone under the weight of the handset, and free of said weight device.

2. A telephone handset holder as defined in claim 1, and telescoping elements extendable out of said supporting arm, said clamp device being mounted on the outer telescoping element, said outer telescoping element as the elements are retracted upon the supporting arm being adapted to extend inwardly under the pivotal connection of the supporting arm with the side walls, said means for rendering ineffective the weight device comprising a depending trigger catch device pivoted upon said side walls and adapted to engage with said weight device to support the same on the casing independently of the supporting arm and normally biased out of engagement with said weight device, the inner end of said outer element being engageable with said trigger device as the supporting arm is lowered and the telescoping elements retracted upon the arm to depress the trigger device for engagement with said weight device to render the weight device ineffective.

References Cited in the file of this patent

UNITED STATES PATENTS

| | | |
|---|---|---|
| 2,435,816 | Anderson | Feb. 10, 1948 |
| 2,521,043 | Citso | Sept. 5, 1950 |

FOREIGN PATENTS

| | | |
|---|---|---|
| 272,713 | Switzerland | Mar. 16, 1951 |
| 409,196 | Germany | Feb. 2, 1950 |